March 15, 1932.  J. MIHALYI  1,849,308
VIEW FINDER FOR CAMERAS
Filed Nov. 21, 1927   2 Sheets-Sheet 1
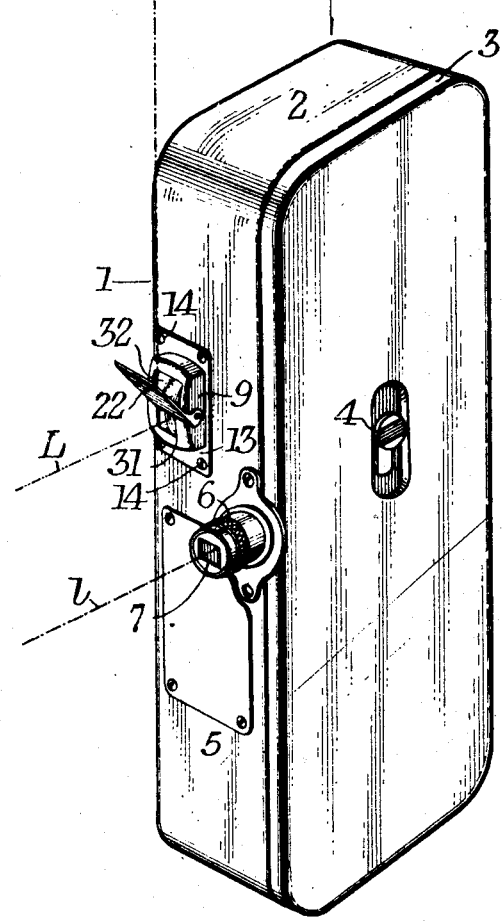
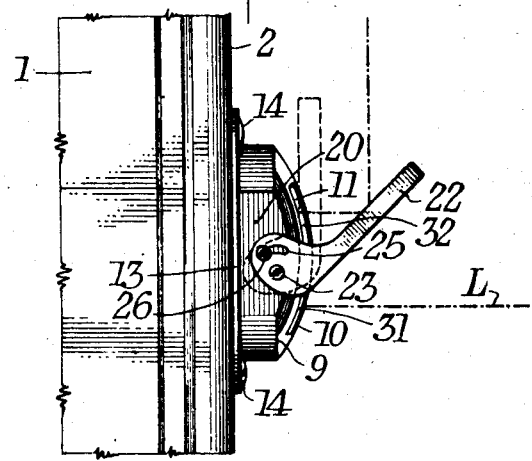
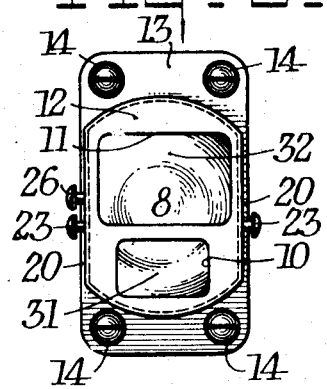
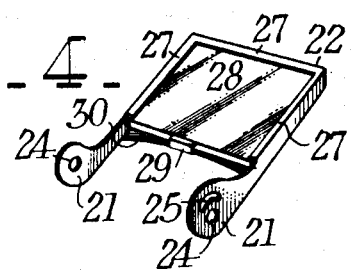
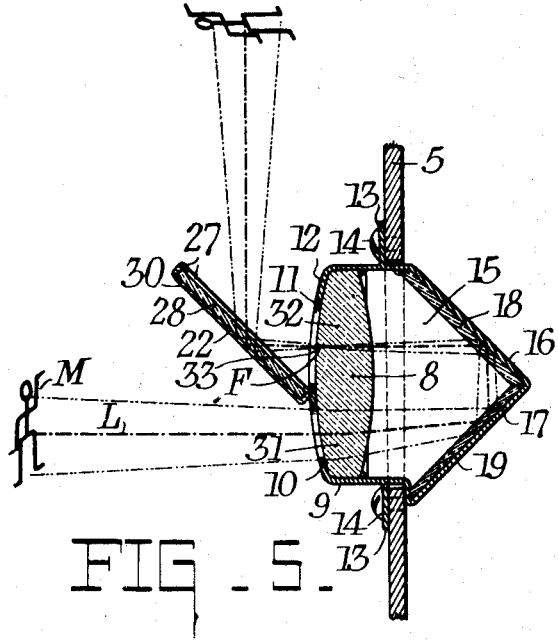
Inventor
Joseph Mihalyi,
R. L. Stuchfield,
Donald H. Stewart
By
Attorneys March 15, 1932. J. MIHALYI 1,849,308
VIEW FINDER FOR CAMERAS
Filed Nov 21, 1927 2 Sheets-Sheet 2

Inventor,
Joseph Mihalyi,
R. L. Stinchfield
Donald H. Stewart
By
Attorney

Patented Mar. 15, 1932

1,849,308

UNITED STATES PATENT OFFICE

JOSEPH MIHALYI, OF ROCHESTER, NEW YORK, ASSIGNOR TO EASTMAN KODAK COMPANY, OF ROCHESTER, NEW YORK, A CORPORATION OF NEW YORK

VIEW FINDER FOR CAMERAS

Application filed November 21, 1927. Serial No. 234,800.

This invention relates to photography, and more particularly to finders for photographic cameras. One object of my invention is to provide a simple finder especially adapted for use on compact cameras having a minimum space to accommodate a finder. Another object is to provide a reflecting finder for which but little space is required. Another object is to provide a single lens finder, using portions of the lens for producing and receiving an image. Another object is to provide a finder which folds compactly against a camera wall. Another object is to provide a finder in which the viewed image is erect and correct from right to left enabling an object to be readily followed. Another object is to provide a view finder in which an image formed by one portion of the lens is focused upon or close to another portion of the same lens by suitable reflectors, and other objects will appear from the following specification, the novel features being particularly pointed out in the claims at the end thereof.

Coming now to the drawings wherein like reference characters denote like parts throughout:

Fig. 1 is a perspective view of a camera upon which a finder constructed in accordance with and embodying one form of my invention is mounted;

Fig. 2 is an enlarged side elevation of the finder shown in Fig. 1;

Fig. 3 is a front elevation of the same finder with the outside reflector removed;

Fig. 4 is a perspective view of the reflector removed from Fig. 3;

Fig. 5 is a cross section through the finder illustrating a preferred form of my finder;

Figure 6:
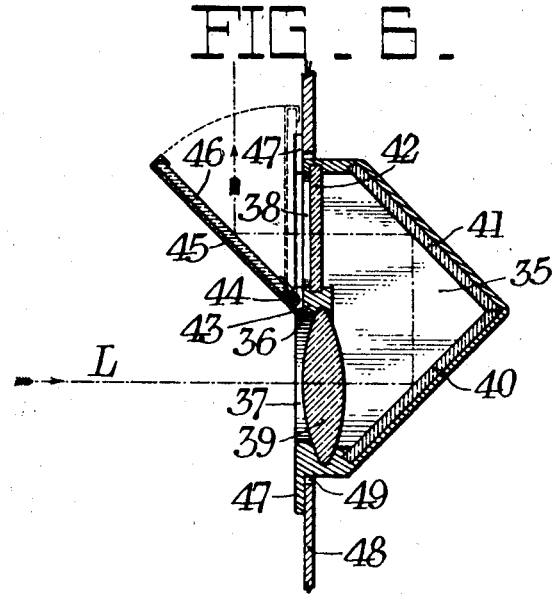
Fig. 6 is a cross section through a finder showing a second embodiment of my invention.

In order to secure the utmost compactness in camera construction and particularly in motion picture camera construction, it is sometimes necessary to place a reflecting finder in any place where it can be accommodated; consequently, the usual type of finder cannot be employed because of the room required to reflect the image upwardly behind the finder objective lens.

With my improved type of finder but little space is required, and since the image is reflected from the finder outside of the camera wall, the finder may be placed in any position where there is sufficient clearance for a small portion of the finder which projects through the camera wall.

As shown in Fig. 1, I have illustrated my finder as mounted upon a motion picture camera 1 of a small compact "hand camera" type. The camera may consist of a body portion 2 having a door 3 through which the film may be loaded and unloaded when the door is released by a knob 4. On the front wall 5 of the camera there is the usual objective mount 6 which is preferably provided with a mask 7 with approximately the proportions of the exposure area. The line $l$ indicates a ray of light passing through the objective in mount 6 to the film.

As also shown in Fig. 1, my finder can be readily mounted close to the camera objective, line L indicating the path of a light ray entering the finder. In the form illustrated this finder comprises a lens 8 which is carried by a metal housing 9 which partially encloses the lens 8, two apertures 10 and 11 being formed in the plate 12 which in effect forms a mask.

As best shown in Fig. 3, the masks 10 and 11 are preferably of different size, and I show both of these masks to be of substantially the same proportions as the normal picture area. It is not necessary for mask 10, however, to be of this proportion, although there are certain advantages in having it of the shape illustrated.

The housing 9 is provided with a flange 13 which may be affixed by screws 14 to a camera wall 5, and behind it the housing 9 is extended at 15 to provide angularly disposed walls 18 and 19. In the present instance these reflectors are shown as being mirrors of glass silvered on the back in the usual manner. These, however, are employed solely because they are inexpensive. Obviously a prism would provide the reflecting surfaces just as well although the cost would be greater. Front silvered mirrors are better than the usual back silvered type, and may, of course, be used if desired.

On the front portion 9 of the housing there are provided flat sides 20 to which the side arms 21 of a cover plate 22 may be hinged by pins 23 passing through apertures 24 in these arms. One arm is preferably provided with an arcuate slot 25 through which a pin 26 passes so that the extent of movement of the cover plate 22 with respect to housing 9 is thereby limited.

The cover plate 22 is flanged at 27 to receive a reflector 28 which may be held in place by a suitable lug 29, as shown in Fig. 4. The reflector 28 can thus be moved from the position shown in full lines in Fig. 2 to a position shown in broken lines in the same figure wherein the protective covering formed by the plate 30 protects the reflector.

The lens 8 as above described is divided into two portions by a mask 12, and that portion of the lens 31 which lies behind the mask opening 10 serves as an image-forming lens, while that portion of the lens indicated at 32 lying behind mask opening 11 serves as an image-receiving lens, thus one lens performs two functions.

As indicated in Fig. 5, the image of a man M may proceed along the line L through lens portion 31, this portion of the lens bringing the image of the man to a focus at F on or close to lens area 32. For best results the image should be focused on the surface 33 of lens area 32 so that the image lies within the mask 11, since by doing this errors due to parallax will not exist, and the finder will, therefore, register the correct field of view. As indicated in Fig. 5, the reflectors 18 and 19 bend the light rays so as to bring the focal point of the lens upon the surface of the lens itself. The function of reflector 28 is merely to reflect the focused image at an angle to the lens axis into a position in which it may be readily viewed. In the present instance I have shown this angle to be substantially 90°, although, of course, this angle may be adjusted to suit the particular shape of the camera upon which the finder is to be employed. When the finder is in use the cover 22 may be swung upon its hinge to the viewing position shown in full lines in Figs. 1, 2, and 5, and when not in use the holder may be swung from this position to that shown in broken lines in Fig. 2 wherein it lies close to the housing 9.

Figure 7:
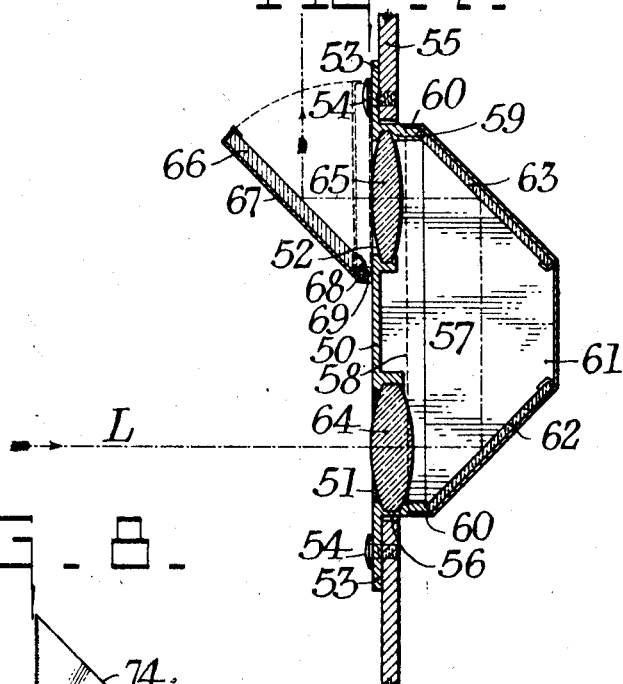
Fig. 7 is a cross section through a finder showing a third form of my invention.

Although the finder described above is a preferred embodiment of my invention, obviously different embodiments may be constructed, such as those shown for instance in Fig. 6 and Fig. 7.

In Fig. 6 the finder preferably consists of a die cast housing 35, the front of which 36 includes two openings 37 and 38 which in effect form two masks. In opening 37 there is mounted a positive lens 39 for forming an image which is reflected by mirrors 40 and 41, here shown as being mirrors silvered on the front side. These mirrors reflect the image which is brought to a focus upon a ground glass screen 42 which is carried in the opening 38. Lugs 43 on the base 35 provide bearings for a hinged pintle 44 upon which is hingedly mounted a frame 45 which carries a mirror 46 for reflecting the image formed on the ground glass 42 into a viewing position. The front 36 of the casing 35 is provided with a flange 47 extending around the outside of the casing, so that the finder may be attached to a camera wall 48 by merely inserting the casing 35 through the opening 49 in the wall. The mirror 46 may be swung upon its hinge from the position shown in full lines, Fig. 6, to that shown in broken lines.

It should be noted that this finder is constructed to lie flat against the camera wall 48, and projects outwardly from the wall only a very slight distance. While the image is not quite as bright as the image formed by the finders shown in Figs. 1 and 7, satisfactory results can, nevertheless, be obtained with it.

Where it is not necessary to make the finder quite so compact as the finder shown in the first two embodiments of my invention, a finder as shown in Fig. 7 may be used. In this case I prefer to provide a die cast plate 50 which is the mask plate for two openings 51 and 52. This plate preferably has a flange 53 extending around its periphery which may be fastened by screws 54 to a camera wall 55 by inserting the body portion 57 of the finder through an opening 56. Plate 50 is preferably provided with a rearwardly extending flange 58 having a rabbet 59 around its rear edge to receive a flange 60 of a sheet metal housing 61, which carries reflecting surfaces, here shown as front surfaced mirrors 62 and 63.

Opening 51 is provided with a positive lens 64 which provides light rays which are bent by mirrors 62 and 63 so that they are focused upon a surface of a collective lens 65. The image formed by this lens is reflected by a mirror 66 to a convenient direction for viewing. For the sake of compactness mirror 66 is mounted in a carrier 67 hinged at 68 to a pintle which is supported by lugs 69 projecting upwardly from the plate 50.

It will be noticed that in the different embodiments of my invention each of the finders are constructed so that only a small area inside of the camera is used for the finder. In all of the embodiments it should also be noted that the finder may be placed very close to the camera objective, because after being reflected upon the first mirror, the image does not pass upwardly through the entire camera parallel to the camera wall, but it is again reflected and passes upwardly outside of the camera wall. Thus the spaces formerly occupied by the finder may now be used for the film reels, spring motor, and other equipment used on compact hand held motion picture apparatus of well known types.

For convenience in the specification and claims I have referred to reflectors in the different embodiments of my invention as lying behind or in front of the image forming lens. The mirrors referred to as lying behind the lens are the mirrors 18—19, 40—41, and 62—63 which are enclosed in the housing which normally lies within the camera body. The mirrors lying in front of the lens are the mirrors 28, 46, and 66 which lie outside of the camera wall.

Since only a small portion of the finder body projects inside of the camera wall, and since it is not important to position the inwardly projecting finder portions to avoid camera mechanism, the finder may be usually placed close to the camera objective so that the lines L and l are close to each other. This, of course, is desirable since errors due to parallax are reduced to a minimum, and the finder is thus rendered more accurate for both nearby and distant views.

It should be especially noticed that with a finder constructed in accordance with my invention, the image appears to be exactly the same from both right to left and from top to bottom as the field of view. This enables an operator to follow his subject if necessary, avoiding the tendency to turn the wrong direction as is customary where a finder reverses the image from right to left.

Figure 8:
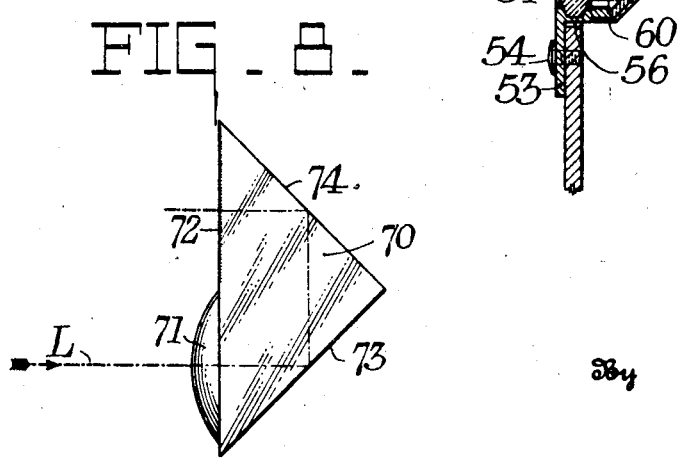
Fig. 8 is a side elevation of a combined lens and prism which may be used in still another embodiment of my invention.

It is to be understood that where I refer to reflecting surfaces in the specification and claims that this term is to include a front or rear surfaced mirror or a prism, since these are well known equivalents. As an example of a finder including a prism I may use, as shown in Fig. 8, a prism 70 having formed as an integral part thereof a lens 71 on a portion of the front surface of this prism. Above the lens 71 the surface of the prism is preferably ground at 72 to form an image-receiving member. The surfaces 73 and 74 are preferably silvered so that these reflecting surfaces bend the light rays passing from lens 71 so that they will come to a focus on the ground glass surface 72 which is at substantially right angles to the axis L of the lens.

In embodying this device in a finder, a finder substantially like that shown in Fig. 6 may be used substituting the combined prism and lens 70—71 for the lens 39, mirrors 40 and 41 and the ground glass 42.

Obviously a finder constructed in accordance with the foregoing description is especially suitable for use as an attachment for cameras, because by cutting a single aperture in any camera wall where there is a little clearance behind the aperture, my finder may be readily attached by screws in position for use. It is usually possible to find an area of the front wall where such a mounting can be made. My finder is also suitable for production as standard equipment because it may be assembled as a unit and may be easily placed on the camera.

Having thus described my invention, what I claim as new and desire to secure by Letters Patent is:—

1. In a camera finder, the combination with a lens, of means for reflecting light rays passing through one part of said lens to another part of said lens, whereby the single lens constitutes an image-forming and an image-receiving lens.

2. In a camera finder, the combination with a lens, of means for reflecting light rays passing through one part of said lens to another part of said lens, whereby the single lens constitutes an image forming and an image-receiving lens and a reflector by which the image may be viewed.

3. In a camera finder, the combination with a lens, means for dividing the lens into two parts whereby one part may constitute an image-forming lens and the other part an image-receiving lens, and a plurality of reflecting surfaces for bending the light rays between the parts of the lens.

4. In a camera finder, the combination with a lens, means for dividing the lens into two parts whereby one part may constitute an image-forming lens and the other part an image-receiving lens, a plurality of reflecting surfaces for bending the light rays between the parts of the lens, and a reflector adapted to reflect the formed image into a a position to be viewed.

5. A finder for cameras including a single positive lens having a predetermined focal length, and a plurality of reflecting surfaces adapted to bend light rays passing through a portion of the lens to focus said rays upon another portion of said lens.

6. A finder for cameras including a single positive lens having a predetermined focal length, and a plurality of reflecting surfaces adapted to bend light rays passing through a portion of the lens to focus said rays upon another portion of said lens, and a reflector for reflecting the focused image into a position to be viewed.

7. A finder for cameras including a positive lens, and a plurality of angularly disposed reflecting surfaces adjacent the lens whereby an image formed by one part of said lens may be viewed on another portion of the same lens.

8. A finder adapted to be mounted on a camera wall including a lens and a plurality of reflecting surfaces positioned adjacent the lens and adapted to reflect an image formed by the lens into a position to be viewed, one of said reflecting surfaces being on one side of the lens and the other reflecting surfaces being positioned on the opposite side of said lens.

9. A finder for cameras including a positive lens, a pair of angularly disposed reflecting surfaces on one side of the lens and a view reflecting surface on the opposite side of the lens from the angularly disposed reflecting surfaces, said view reflecting surface being hingedly secured to the lens.

10. A finder for cameras including a positive lens, a pair of angularly disposed reflecting surfaces on one side of the lens and a view reflecting surface on the opposite side of the lens from the angularly disposed reflecting surfaces, said view reflecting surface being hingedly secured to the lens, and means associated with the hinge connection for limiting the movement of the reflector thereupon.

11. A finder for cameras including a housing, a lens carried by the housing, a mask for dividing said lens into two parts, one part serving as an image-forming part and the other as an image-receiving part, a pair of angularly disposed reflectors carried in the housing behind the lens, a viewing reflector carried by the housing in front of the lens, said last named reflector limiting the quantity of light rays parallel to the lens axis passing into the finder.

12. In a finder, the combination with a positive lens, of reflectors associated therewith, a mask lying adjacent the lens having two openings therein, one opening approximating the proportions of the field of view, and said reflectors positioned to direct light rays from one mask opening to the other, whereby the image formed in the second mask opening may define a predetermined field of view.

13. In a finder adapted to be mounted on a camera wall, the combination with a lens, of a pair of angularly disposed reflectors positioned on one side thereof, an image reflecting surface positioned on the other side thereof, a unitary mount for holding the above finder parts, only that part of the mount holding the angularly disposed reflectors being adapted to be inside of the camera wall.

14. In a finder adapted to be mounted on a camera wall, the combination of a lens, a mount for the lens comprising a flanged plate enclosing said lens, apertures being formed in the plate over portions of said lens, and a pair of angularly disposed reflectors for directing an image formed by a lens portion lying beneath one aperture to a focus in the other aperture, another reflector mounted at an angle to the lens axis, the flanged plate of the mount being adapted to position only the pair of angularly disposed reflectors inside of the camera wall.

15. In combination, a camera having a wall, a finder adapted to be mounted thereon including a positive lens, divided into an image-forming and an image-receiving part, a pair of reflecting surfaces mounted inside of the camera wall behind the lens, and a reflector mounted outside of the camera wall and in front of a portion of said lens whereby an image formed by part of the lens may be directed into a viewing position on another part of the lens and may be reflected outside of the camera wall.

16. A finder for cameras including a housing, a mask plate having two openings lying substantially in the same plane, a single lens back of both openings, a plurality of reflecting surfaces adapted to focus light rays entering the lens through one mask opening at the other mask opening, and means for reflecting the image to a viewing position.

17. A finder for cameras including a lens and an image-receiving member located one above the other and in the same plane, and means for reflecting the light rays from the former to the latter.

18. A finder for cameras including a lens, and an image-receiving member located one above the other and in the same plane, means for reflecting light rays from the lens to the image-receiving member, and means for reflecting the image formed on the image-receiving member to a position for viewing.

19. As an article of manufacture, a reflecting camera finder adapted to be mounted in a single aperture of a camera wall comprising a housing, an image-forming and an image-receiving member carried by the housing, a plurality of reflecting surfaces adjacent the image-forming and image-receiving member for bending the light rays and means contacting with the camera wall about the aperture therein for fastening the finder to the camera wall.

Signed at Rochester, New York this 17th day of November, 1927.

JOSEPH MIHALYI.